United States Patent [19]

Davis

[11] Patent Number: 4,804,154
[45] Date of Patent: Feb. 14, 1989

[54] PASSIVE AERODYNAMIC LOAD MITIGATION SYSTEM

[75] Inventor: James M. Davis, Caddo Mills, Tex.

[73] Assignee: E-Systems, Inc., Dallas, Tex.

[21] Appl. No.: 165,381

[22] Filed: Feb. 29, 1988

Related U.S. Application Data

[63] Continuation of Ser. No. 910,085, Sep. 22, 1986, abandoned.

[51] Int. Cl.$^4$ .............................................. B64C 1/36
[52] U.S. Cl. .................................. 244/1 R; 244/82; 73/188; 343/705
[58] Field of Search ................ 244/1 R, 82, 75 A; 343/705; 73/188

[56] References Cited

U.S. PATENT DOCUMENTS

| | | |
|---|---|---|
| 2,040,305 | 5/1936 | Graham . |
| 2,055,307 | 9/1936 | Wilhelm . |
| 2,081,957 | 6/1937 | Roche ............................ 244/75 A |
| 2,809,520 | 10/1957 | Richard, Jr. . |
| 2,869,366 | 1/1959 | Nitikman . |
| 3,224,269 | 12/1965 | Weir . |
| 3,474,669 | 10/1969 | Carter et al. . |
| 3,514,997 | 6/1970 | Gwathmey et al. ............ 244/1 R |
| 3,548,653 | 12/1970 | Corey . |
| 3,548,654 | 12/1970 | Cole, Jr. . |
| 3,882,721 | 5/1975 | Neany et al. ...................... 73/188 |
| 4,052,894 | 10/1977 | Pinnell et al. . |
| 4,078,426 | 3/1978 | Casani et al. . |
| 4,184,149 | 1/1980 | Baker et al. . |
| 4,402,220 | 9/1983 | Kuhlmann et al. ............... 73/188 |

*Primary Examiner*—Galen Barefoot
*Assistant Examiner*—Rodney Corl
*Attorney, Agent, or Firm*—Albert M. Crowder, Jr.

[57] ABSTRACT

A passive load mitigation system for supporting transducers on a body moving through a fluid stream is described. According to the invention, a streamlined aerodynamic surface for supporting the transducers is attached to the body via a pivot axis. The axis supports the surface in a torsionally unrestrained manner in at least one rotational degree of freedom about the pivot axis. Therefore, as the body moves through the fluid stream, the surface remains substantially parallel to the plane of the stream. Aerodynamic stability is ensured by forming the surface with substantially trapezoidal or parallelogram shaped sidewalls and by mounting the surface on the pivot axis such that the surface's aerodynamic center is located downstream of the pivot axis. Flutter is prevented or substantially reduced by increasing the surface's bending stiffness or by incorporating ballast weights on a tip pod attached to a portion of the surface.

9 Claims, 2 Drawing Sheets

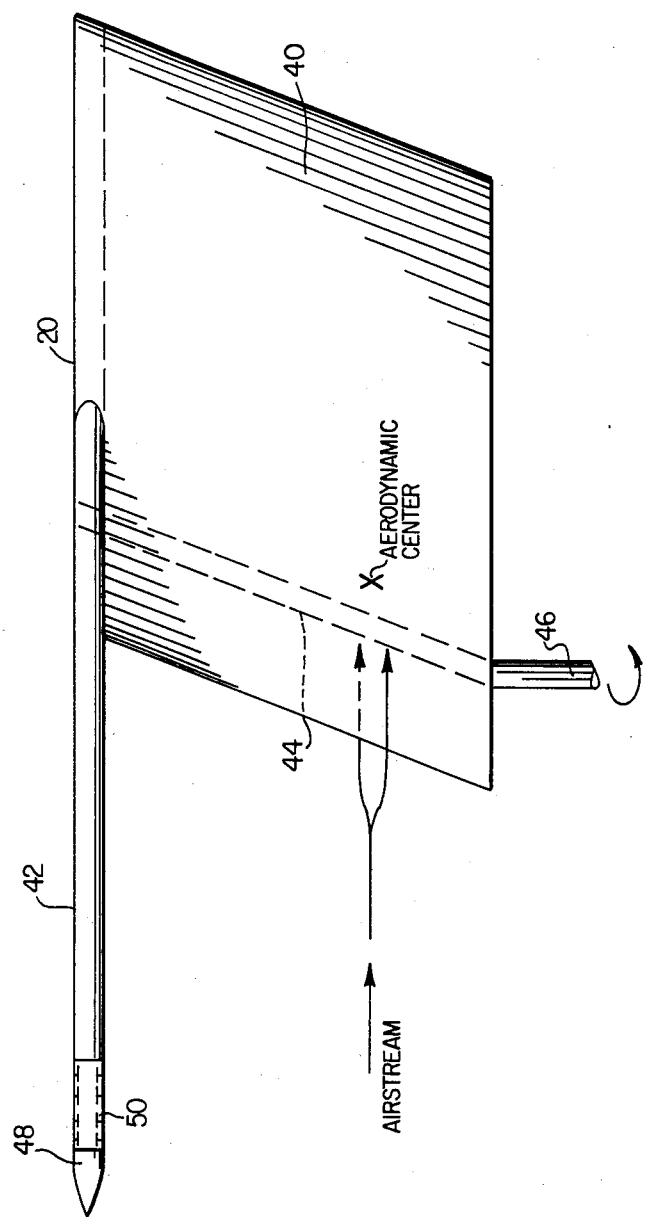

PASSIVE AERODYNAMIC LOAD MITIGATION SYSTEM

CROSS REFERENCE TO RELATED APPLICATIONS

This application is a continuation of application Ser. No. 910,085 filed Sept. 22, 1986, now abandoned.

TECHNICAL FIELD

The present invention relates to apparatus for installing external electromagnetic transducers on an aircraft and more particularly to a passive aerodynamic load mitigation system for supporting such transducers in an aerodynamically-stable fashion on the aircraft.

BACKGROUND OF THE INVENTION

It is known in the prior art to house electromagnetic aircraft emitters and sensors in an aerodynamically-shaped surface or housing on the outside of an aircraft. Prior techniques for housing such devices, however, have resulted in support configurations in which the structural interface between the aircraft and the aerodynamic surface precludes relative motion between the aircraft and the base of the surface. Such "rigid" structural connection between the aircraft and the surface results in movement of the surface relative to the incident airstream in the same manner as the aircraft to which it is attached. Accordingly, during a portion of the aircraft flight envelope, a significant angle of attack exists between the (varying) plane of the airstream and the surface. Because airloads normal to the plane of the surface are often sizable, such prior art techniques for supporting external aircraft transducers may affect the aerodynamic stability of the aircraft.

Accordingly, there is a need for an improved apparatus for installing external electromagnetic transducers on an aircraft which overcomes these and other problems associated with prior art techniques.

BRIEF SUMMARY OF THE INVENTION

According to the present invention, a passive aerodynamic load mitigation system is provided for supporting electromagnetic transducers on a body, e.g., an aircraft, moving through a fluid stream. In a preferred embodiment, a streamlined surface is used to support the electromagnetic transducers, the surface having a base portion, a top portion, and first and second symmetrical sidewall portions of substantially trapezoidal or parallelogram shape. A pivot axis has a first end attached to the body and a second end attached to the base of the surface to enable the surface to rotate about the pivot axis. In particular, the pivot axis supports the streamlined surface in a torsionally unrestrained manner in preferably one rotational degree of freedom about the pivot axis. Therefore, as the body moves through the fluid stream, the streamlined surface remains substantially parallel to the plane of the fluid stream. Aerodynamical stablility is maintained by mounting the surface on the pivot axis such that its aerodynamic center is located downstream from the axis. Flutter is prevented or substantially reduced by increasing the surface's bending stiffness or by incorporating suitable ballast weights on a tip pod attached to the top portion of the surface.

BRIEF DESCRIPTION OF THE DRAWINGS

For a more complete understanding of the present invention and the advantages thereof, reference is now made to the following Description taken in conjunction with the accompanying Drawings in which:

FIG. 4 is an elevation view of an alternative embodiment of the load mitigation system of FIG. 1 adapted for preventing or substantially reducing dynamic aeroelastic instability.

DETAILED DESCRIPTION

Figure 1:
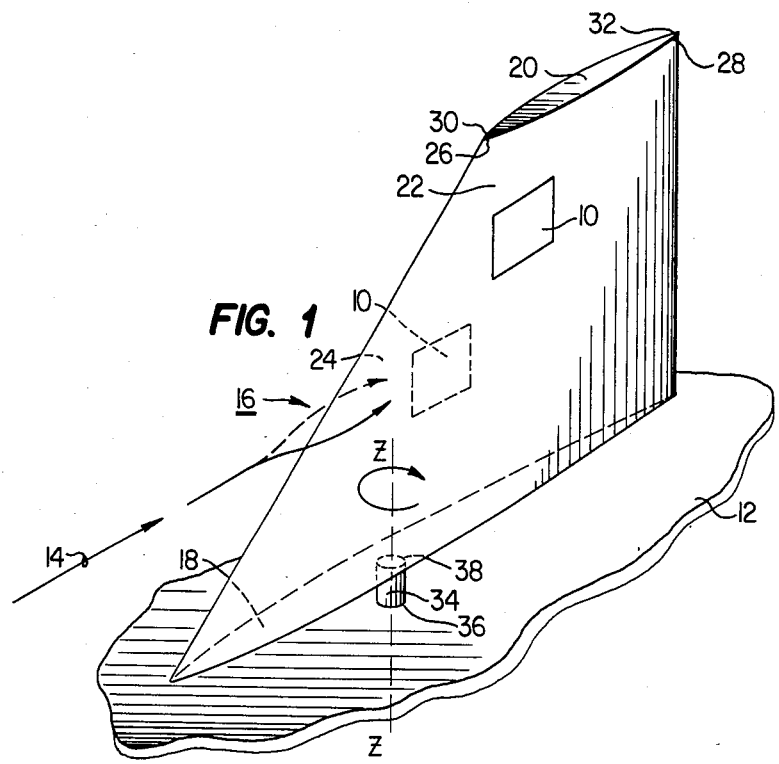
FIG. 1 is a perspective view showing a preferred embodiment of the passive aerodynamic load mitigation system of the present invention attached to a portion of an aircraft.

With reference now to the FIGURES wherein like reference characters designate like or similar parts throughout the several views, FIG. 1 is a perspective view of the preferred passive load mitigation system of the present invention. The load mitigation system is designed to support one or more external electromagnetic transducers 10 on an aircraft fuselage 12 moving through an airstream 14. In the preferred embodiment, the transducers (i.e., electromagnetic emitters and sensors) are housed in or on an aerodynamically streamlined surface or housing 16 which is constructed and attached to the aircraft fuselage 12 in a manner to to be described.

Prior art techniques for attaching aerodynamically-shaped transducer housings have typically resulted in a "rigid" structural tie between the aircraft and the surface. Accordingly, while any positive relative motion between the base of the surface and the aircraft could be described by one or more of six components (three translational and three rotational), such prior configurations normally resulted in constraints for each of these six components. Therefore, during a portion of the aircraft flight envelope, the surface normally exhibited an undesirable, large relative "angle of attack" between the (varying) plane of the airstream and the surface.

The passive aerodynamic load mitigation system of the present invention overcomes the disadvantages associated with prior techniques by providing a streamlined surface or housing 16 which is unrestrained in at least one of its rotational degrees of freedom as will be described. In the preferred embodiment, dynamic stability is most readily achieved by maintaining the surface 16 unrestrained in just one rotational degree of freedom as will be described.

As seen in FIG. 1, the streamlined surface 16 includes a base portion 18, a top portion 20 parallel thereto, and first and second symmetric sidewall portions 22 and 24. The first symmetric sidewall portion 22 includes a front edge 26 and a rear edge 28. Likewise, the second symmetric sidewall portion 24 includes a front edge 30 and a rear edge 32. The front edges 26 and 30 of the first and second sidewall portions 22 and 24 are joined together to ensure that the leading surface of housing 16 is aerodynamically-streamlined. Likewise, the rear edges 28 and 32 of the first and second sidewall portions 22 and 24 are also joined together. Preferably, the surface 16 comprises a fiberglass honeycomb core with a bonded fiberglass outer skin.

According to a first feature of the invention, the streamlined surface 16 is designed to dynamically align itself parallel to the incident airstream through the use of a pivot axis 34 which supports the surface 16 on the aircraft fuselage 12. The pivot axis 34, which preferably is formed of a thick-walled hollow fiberglass or non-ferrous metallic tube, includes a first end 36 attached to the aircraft fuselage and a second end 38 embedded in the honeycomb core of the surface 16. As seen in FIG. 1, portions of the front edges 26 and 30 of the surface 16 adjacent the fuselage 12 are located "upstream" of the pivot axis while the rear edges 28 and 32 are located "downstream" of the axis.

Although not shown in detail, it should be appreciated that the second end 38 of the pivot axis 34 is connected to the surface 16 via any suitable low friction bearing mechanism. Such a mechanism allows the surface 16 to freely pivot about a z—z rotational axis shown in FIG. 1. If desired, the second end 38 of the pivot axis 34 may be permanently secured to the surface 16 or an integral extension thereof, in which case the first end 36 of the pivot axis 34 is rotatably-secured to the aircraft fuselage by the bearing mechanism.

Significantly, use of the pivot axis 34 allows the streamlined surface 16 to be torsionally unrestrained in the z—z rotational degree of freedom. This degree of freedom is one which allows the surface 16 to dynamically orient itself so as to always lie parallel to the plane of the airstream 14. Accordingly, because the surface is symmetrical and aligns itself parallel to the airstream, the steady state "angle of attack" of the surface 16 is always zero, regardless of the orientation of the aircraft 12 relative to the airstream. Because the steady state angle of attack is zero, net steady state airloads normal to the surface 16 are also zero. The system therefore operates to passively mitigate airloads which would otherwise adversely affect the stability of the surface and the aircraft.

Figure 2:
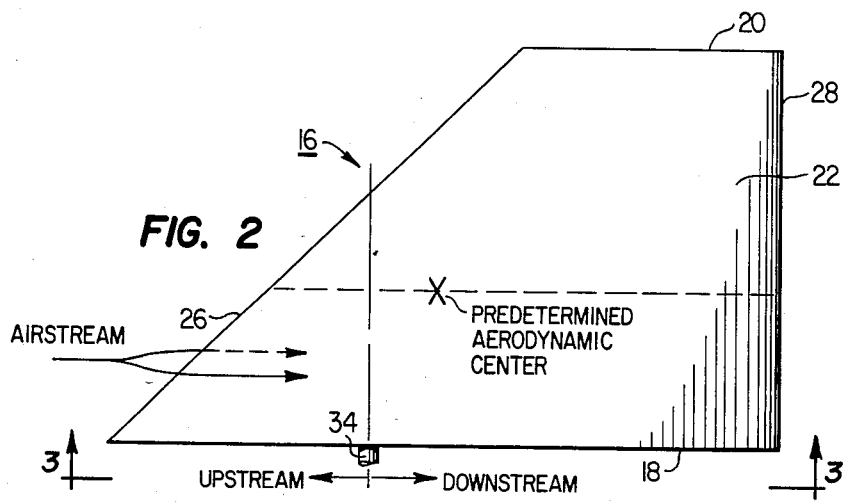
FIG. 2 is an elevation view of the passive aerodynamic load mitigation system of FIG. 1 showing the substantially trapezoidal shape of the sidewall portions.
Figure 3:
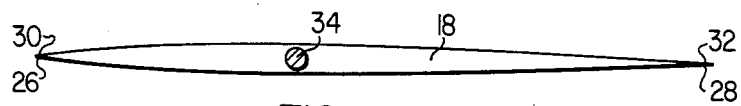
FIG. 3 is a bottom view of the streamlined surface of the load mitigation system taken along lines 3—3' of FIG. 2.

According to another feature of the invention, static aeroelastic instability of the torsionally unrestrained surface 16 is avoided by selecting an aerodynamic configuration and pivot axis location as described below. Referring now to FIGS. 2 and 3, which are side elevation and bottom views, respectively, of the system of FIG. 1, in the preferred embodiment each of the first and second symmetric sidewall portions 22 and 24 of the surface 16 has a substantially trapezoidal shape. As seen in FIG. 3, the base portion 18 preferably has a marquis-shaped structure, as does the top portion 20. While this geometry is preferred, it is not meant to be limiting, as other equivalent geometrical structures may also be used.

Static aeroelastic stability of the surface 16 is maintained by locating the pivot axis 34 such that a chordwise (i.e., a straight line joining the front and rear edges of the surface) location of the aerodynamic center of the surface 16 always lies downstream of the pivot axis. As is known in the art, the "aerodynamic center" of any configuration can be determined by wind tunnel tests or, alternatively, can be established accurately using aerodynamic analysis techniques such as doublet lattice theory. This latter analysis technique determines the real part of a generalized force in the rigid body pitch mode as a function of the chordwise pivot axis location. The pivot axis chordwise location at which the pitch mode generalized force vanishes then defines the aerodynamic center of the configuration. Once this predetermined aerodynamic center is located, the surface 16 is supported on the pivot axis 34 such that this center is located downstream from the axis 34.

According to a further feature of the invention, dynamic aeroelastic instability (flutter) is prevented or substantially reduced by one of two preferred approaches. Flutter is a self-excited instability involving aerodynamic coupling between two or more modes of motion of the system. Classical flutter is typically caused by an energy transfer from the airstream to the structure and is manifested by violet oscillatory motion usually terminating in catastrophic structural failure. It is known in the art that the degree of overall torsional rigidity is one of the primary factors which determines the flutter speed of a lifting surface. According to one approach of the invention to prevent flutter, flutter speed onset is delayed by increasing the bending stiffness of the surface 16.

An alternative, but preferred, approach to preventing or substantially reducing dynamic aeroelastic instability exploits the concept of nodal inertial balancing. Referring to FIG. 4, which is a side elevational view of a alternative embodiment of the system of FIGS. 1–3, an aerodynamically streamlined surface 40 has a substantially parallelogram shape and incorporates a tip pod 42 structurally attached to the top surface 20 thereof. Tip pod 42 is also structurally attached to an embedded mast 44 such that the total system acts as one structural unit. A lower extension 46 of the mast 44 constitutes a pivot axis about which the system is free to rotate as described above with respect to the system disclosed in FIGS. 1-3. The pivot axis 46 is supported by a low friction bearing mechanism (not shown) located interior to the aircraft skin.

According to a feature of the invention, the tip pod 42 includes a distal end 48 which supports one or more ballast weights 50. Preferably, the ballast weights 50 are mounted interior to and substantially near the distal end 48 of the tip pod 42. The ballast weights 50 have inertial values determined by mathematical modeling procedures, such as flutter analysis, and these weights are geometrically located on the tip pod 42 such that an otherwise self-excited aeroelastic instability of the system is suppressed. Such suppression occurs as a result of dynamic inertial cross-coupling between two or more modes of motion of the system.

While the structure of FIG. 4 is preferred, it should be appreciated that the specific structure of the tip pod and/or the location of the tip pod 42 with respect to the top portion 20 of the surface 40 are not meant to be limiting. The tip pod (or equivalent) structure may be suitably rearranged so long as the ballast weights or equivalent structure have the proper inertial values and are geometrically located on the system such that an otherwise self-excited aeroelastic instability of the system is suppressed through dynamic inertial cross-coupling between two or more modes of motion of the system.

The passive aerodynamic load mitigation system of the present invention advantageously supports external electromagnetic transducers on an aircraft in an aerodynamically stable fashion. This operation is achieved by using a streamlined surface which is torsionally unrestrained in one of its rotational degree of freedom, i.e., the degree of freedom which allows the surface to dynamically orient itself so as to always lie parallel to the plane of the airstream. Moreover, static aeroelastic stability of the surface 16 is maintained by selecting a substantially trapezoidal or parallelogram aerodynamic configuration for the sidewall portions of the surface, and by selecting a pivot axis location such that the chordwise location of the aerodynamic center of the surface always lies downstream of the pivot axis. Dynamic aeroelastic instability (flutter) is then prevented or substantially reduced by increasing the bending stiffness of the surface 16 or by incorporating suitable ballast weights on an integral tip pod or like structure as shown in FIG. 4. The system results in aerodynamic and structural impact on the basic aircraft which is significantly reduced as compared to equivalent conventional installations of transducer housings on aircraft.

It should also be appreciated that the basic operating principles of the passive aerodynamic load mitigation system of the invention may also be used to support any type of transducer on a body moving through a fluid stream. Accordingly, the scope of the present invention is not deemed limited to the use of the system for supporting external electromagnetic transducers on an aircraft.

Although the invention has been described and illustrated in detail, it is to be understood that the same is by way of illustration and example only and is not to be taken by way of limitation. The spirit and scope of this invention are to be limited only by the terms of the appended claims.

I claim:

1. A passive aerodynamic structure for supporting electromagnetic transducers on an external surface of an aircraft while mitigating aerodynamic impact and structural load on said aircraft comprising:
   an aerodynamically configured housing for supporting the electromagnetic transducers in an airstream and having a base portion, a top portion and first and second symmetrical sidewall portions,
   means for preventing flutter of said housing comprising:
   a. a tubular tip pod extending horizontally from said housing,
   b. ballast weights geometrically located on the tip pod such that dynamic inertial nodal balancing occurs, and
   c. means for attaching said housing to said aircraft in an unrestrained rotational relationship, and
   means for providing static aeroelastic stability of said housing comprising a pivot mechanism on said housing for attaching said housing to said aircraft in the unrestrained rotational relationship, said pivot mechanism being located with respect to said housing such that the aerodynamic center of the housing always lies on a chord downstream of said pivot mechanism.

2. A passive aerodynamic structure as in claim 1 wherein said tubular tip pod extends horizontally from and in alignment with the longitudinal axis of the top portion of said housing.

3. A passive aerodynamic structure for supporting electromagnetic transducers on an external surface of an aircraft while mitigating aerodynamic impact and structural load on said aircraft comprising:
   an aerodynamically configured housing for supporting the electromagnetic transducers in an airstream and having a base portion, a top portion and first and second sidewalls having at least a leading edge sloping in the downstream direction,
   a pivot arm extending from the bottom of the housing along an axis which intersects the sloping, leading edge such that the aerodynamic center of the housing always lies on a chord downstream from the pivot arm to provide static aeroelastic stability of the housing and,
   means for preventing flutter of the housing comprising:
   (a) a tubular tip pod extending horizontally from said housing,
   (b) ballast weights geometrically located on the tip pod such that dynamic inertial nodal balancing occurs, and
   (c) means for attaching the housing pivot arm to the aircraft in an unrestrained rotational relationship to enable said housing to remain substantially parallel to the plane of the airstream.

4. A passive aerodynamic structure as in claim 3 wherein the sidewall portions of the housing are symmetric and have a substantially parallelogram shape.

5. The passive aerodynamic structure as described in claim 3 wherein the sidewall portions of the housing are symmetric and each has a substantially trapezoidal shape.

6. A passive aerodynamic load and instability mitigation system for supporting electromagnetic transducers on an aircraft comprising:
   a housing for supporting the electromagnetic transducers in an airstream and having a base portion, a top portion and first and second symmetrical sidewalls having at least a leading edge sloping in the downstream direction,
   a pivot mechanism attached to the aircraft for pivotally supporting the housing in a rotatably unrestrained manner for providing aerodynamic and load stability, and
   a pivot arm on said housing for rotatable attachment to the pivot mechanism, said pivot arm extending from the bottom of the housing along an axis which intersects the sloping leading edge such that the aerodynamic center of the housing always lies on a chord downstream of the pivot arm for providing static stability.

7. The passive aerodynamic load mitigation system as described in claim 6 including means for suppressing the self-excited aeroelastic instability of the housing through dynamic cross-coupling between a plurality of modes of motion.

8. A passive aerodynamic load mitigation system for supporting electromagnetic transducers on an aircraft comprising:
   a housing for supporting the electromagnetic transducers in an airstream and having a base portion, a top portion and first and second symmetrical sidewall portions, each of the sidewalls of the housing having a substantially parallelogram shape with parallel leading and trailing edges sloping in the downstream direction, said housing having a predetermined bending stiffness and means for providing dynamic inertial cross-coupling between two or more modes of motion to provide suppression of dynamic aeroelastic instability, and
   a pivot mechanism attached to the aircraft for pivotally supporting the housing, said pivot mechanism supporting the housing in a torsionally unrestrained manner along an axis extending through the leading edge of the housing at a point that is always upstream of the aerodynamic center of the housing.

9. The passive aerodynamic mitigation load system as described in claim 8 further including a tip pod attached to the top portion of the surface and including at least one ballast weight mounted substantially at the distal end of the tip pod and having a predetermined inertial value for providing nodal inertial balancing of the surface.

* * * * *